(12) United States Patent
Lee

(10) Patent No.: US 8,291,787 B1
(45) Date of Patent: Oct. 23, 2012

(54) ROTATION GENERATING SYSTEM

(76) Inventor: Dug Gum Lee, Los Angeles, CA (US)

( * ) Notice: Subject to any disclaimer, the term of this patent is extended or adjusted under 35 U.S.C. 154(b) by 0 days.

(21) Appl. No.: 13/279,532

(22) Filed: Oct. 24, 2011

(51) Int. Cl.
*F16H 55/00* (2006.01)
(52) U.S. Cl. .................... 74/434; 16/46; 476/70
(58) Field of Classification Search ............... 16/45, 46; 74/434, 446; 476/70
See application file for complete search history.

(56) References Cited

U.S. PATENT DOCUMENTS

| | | | | |
|---|---|---|---|---|
| 932,624 | A | * | 8/1909 | Mathes .............................. 16/45 |
| 1,368,465 | A | * | 2/1921 | Sutliffe .............................. 16/46 |
| 5,398,618 | A | * | 3/1995 | McMullen ......................... 16/45 |
| 7,669,492 | B2 | | 3/2010 | Lee |

* cited by examiner

*Primary Examiner* — William C Joyce
(74) *Attorney, Agent, or Firm* — IPLA P.A.; James E. Bame

(57) ABSTRACT

A rotation generating system comprises a base disk defined by a rim, top and bottom surfaces; a ball bearing engaged on and along the disk rim, said ball bearing comprising balls, a ring rotatably engaging the balls to the disk rim, and side supports propping the balls between the disk rim and the ring; and a shaft having first and second ends, wherein the first end is fixed to an eccentric portion of the disk top surface, wherein the shaft is angled with the disk top surface by forty-five (45) degrees.

10 Claims, 6 Drawing Sheets

ROTATION GENERATING SYSTEM

BACKGROUND OF THE INVENTION

This invention relates to an industrial gear apparatus, more particularly to an improved rotation generating system enabling an individual gear to boost its gear rotation using a combination mechanism of an eccentric shaft and its forty-five degree angle to the gear surface.

A variety of different types of rotating devices have been introduced like motors, propellers and windmills. In order to generate a rotational force, the power must come from sources like manual, battery, solar, or combustion of energy. When it comes to power generation, the less amount it takes to generation the same power, the better. There are known ways to lower the amount of power utilized from the power source, which can include modification of the rotation source design depending on the weight and structure of the rotating device.

A demand on the market is an apparatus generating a rotation force utilizing an eccentric property boosting a gear rotation resulting from a minimal application of an external power.

A still increasing demand on the market is to introduce a rotation generating system enabling a gear system to enhance the power efficiency while maximizing power output using a simplified power transfer mechanism.

SUMMARY OF THE INVENTION

The present invention is contrived to overcome the conventional disadvantages. Accordingly, an objective of the present invention is to provide a rotation generating system enabling an individual gear to boost its gear rotation using a combination mechanism of an eccentric shaft and its forty-five degree angle to the gear surface.

Another objective is to provide a rotation generating system utilizing an eccentric property boosting a gear rotation while minimizing an external power application.

A still another objective is to provide a rotation generating system enabling a gear system to enhance the power efficiency while maximizing power output using a simplified power transfer mechanism.

In order to achieve these and other objectives, a rotation generating system according to the prevent invention Comprises a base disk defined by a rim, top and bottom surfaces; a ball bearing engaged on and along the disk rim, said ball bearing comprising balls, a ring rotatably engaging the balls to the disk rim, and side supports propping the balls between the disk rim and the ring; and a shaft having first and second ends, wherein the first end is fixed to an eccentric portion of the disk top surface, wherein the shaft is angled with the disk top surface by forty-five (45) degrees.

The eccentric portion is substantially centered between the disk rim and a central point of the base disk. The ring is ratatably engaged to a target surface, where the target surface is substantially flat, shaped inwardly or outwardly circular relative the system.

The rotation generating system may further comprise a plurality of second base disks structured identically in conjunction with the first base disk, the ball bearing, and the shaft, wherein said each ring rotates on and along a target surface. In this construction, the ring may be ratatably engaged to a target surface, where the target surface is substantially flat or circular.

For a better performance, the system may further comprise a platform attached to the second end of the shaft, wherein the platform is substantially parallel to the base disk, and a second platform outwardly extending in crank from the first platform. Here, the first platform is angled with the shaft by ninety (90) degrees and substantially oriented toward an opposite direction passing the disk central point from the eccentric portion.

Although the present invention is briefly summarized, the full understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

Referring to the accompanying drawing, a rotation generating system 10 according to the present invention will now be explained.

Figure 1:
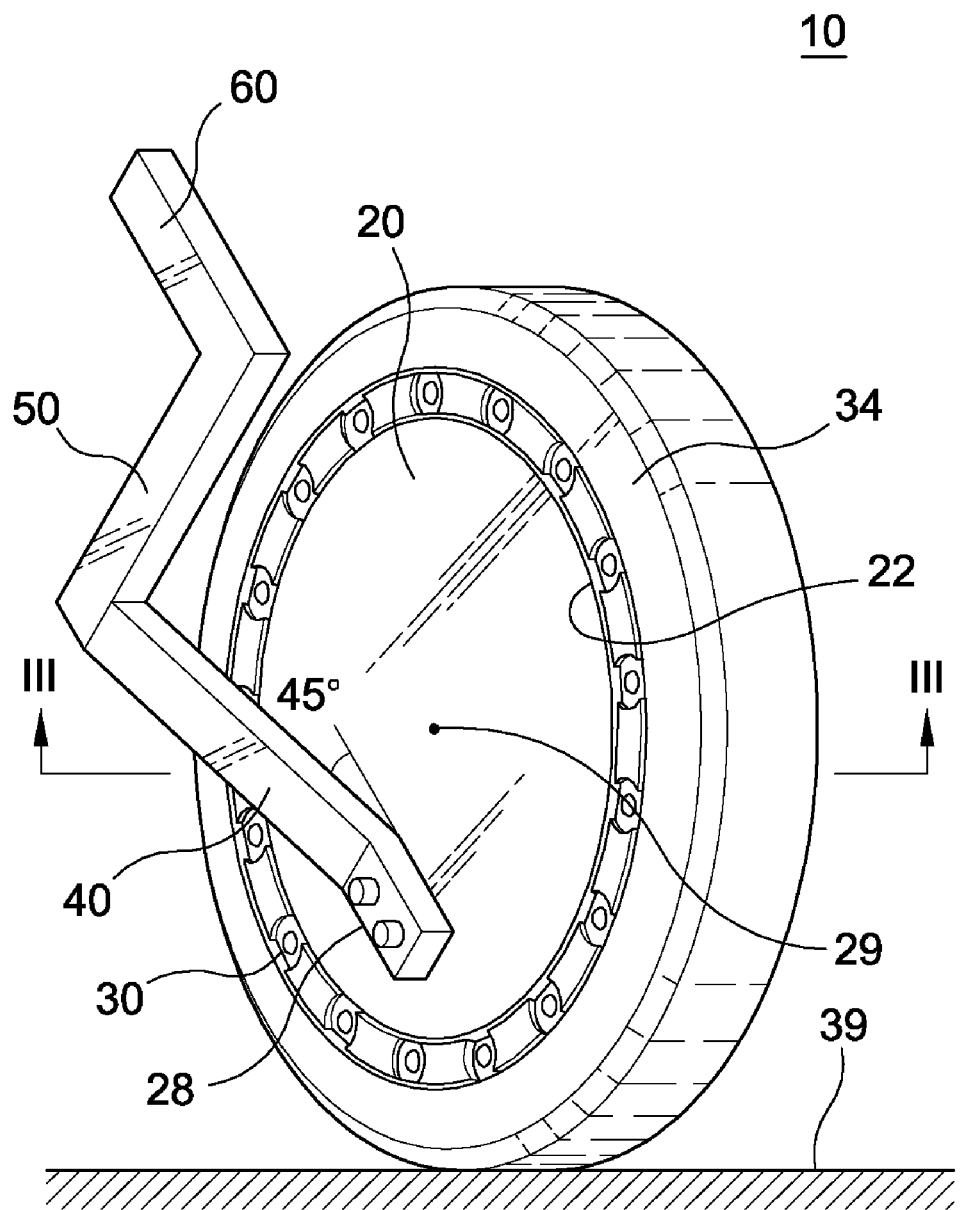
FIG. 1 is a perspective view of a rotation generating system according to the present invention.
Figure 2:
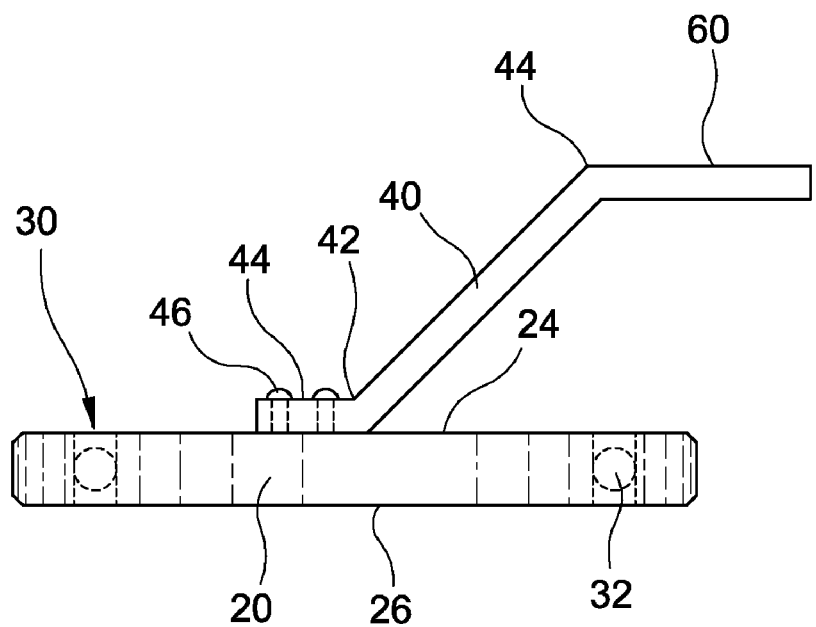
FIG. 2 is a schematic side view of FIG. 1.
Figure 3:
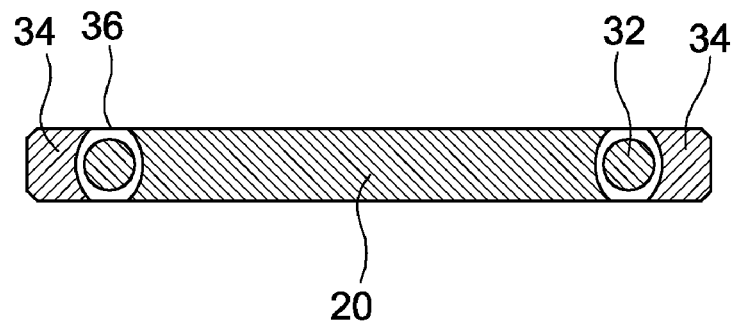
FIG. 3 is a cross sectional view taken along the line III-III in FIG. 1.

As shown in FIG. 1, the rotation generating system 10 comprises a base disk 20, a ball bearing 30, and a shaft 40. The base disk 20 is defined by a rim 22, top and bottom surfaces 24, 26. The ball bearing 30 is engaged on and along the disk rim 22. In this construction, the ball bearing 30 comprises balls 32, where the ring 34 is rotatably engaged to the balls 32 which are formed on and along the disk rim 22. Side supports 36 are provided to prop the balls 32 between the disk rim 22 and the ring 34.

For a better performance, a shaft 40 having first and second ends 42, 44 is provided. Here, the first end 42 of the shaft 40 is fixed to an eccentric portion 28 of the disk top surface 24. Preferably, it is recommended to form the shaft 40 being angled with the disk top surface by forty-five (45) degrees.

The eccentric portion 28 is displaced from a center 29 of the top surface 24 of the base disk 20. The eccentric portion 28 may be substantially centered between the disk rim 22 and the central point 29 of the base disk 20.

In a preferred version, the ring 34 is ratatably engaged to a target surface 39 so that the rotation generation system 10 can adapt to an external apparatus that requires torque or rotational force, or other physical forces germane a ball gearing apparatus. Depending on the industrial requirements, the target surface 39 may be substantially flat so that the system 10 can roll on and along the target surface 39 in a linear mode.

When a plurality of the systems 10 are applied to the target surface 39 which is flat, the shaft 40 may be eccentrically displaced closer to the target surface so that the eccentric portion 28 remains between about the center 29 and the garget surface 39. Depending on the industrial application, the eccentric portion 28 receiving the shaft 40 may be displaced away from the target surface 39 such that the shaft 40 stays above the central point 29 with the target surface leaving below the central point 29. Also, the shaft 40 can be flexibly located relative the target surface 39.

Figures 4, 5:
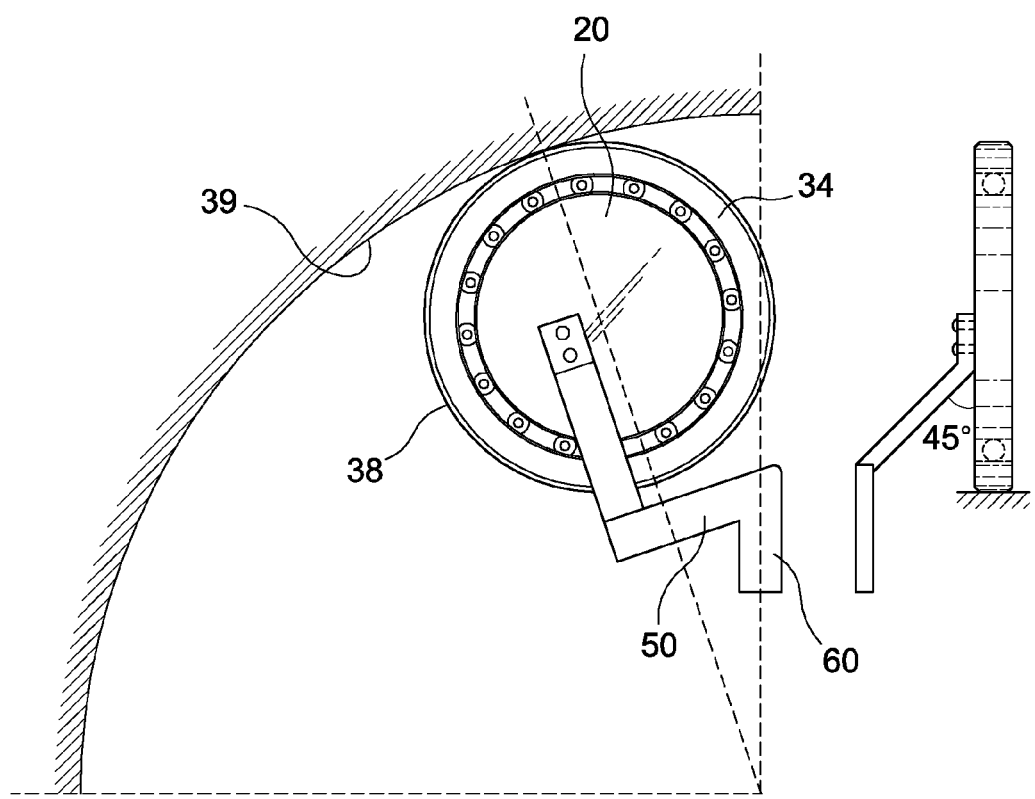
FIG. 4 is a schematic application view of the present invention where the rotation generating system is applied to an outward circle relative the system.
FIG. 5 is a schematic side view of FIG. 4.
Figure 6:
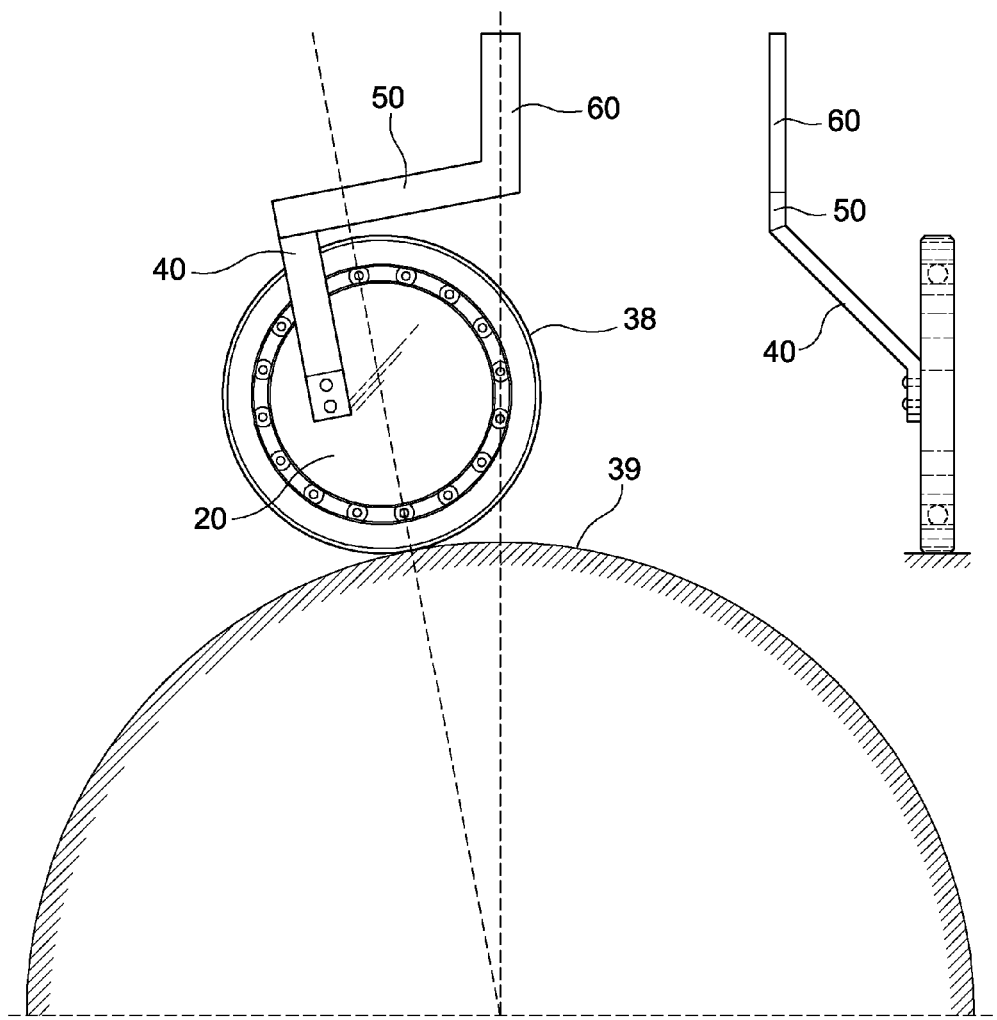
FIG. 6 is another schematic application view of the present invention where the rotation generating system is applied to an inward circle relative the system.
Figure 7:
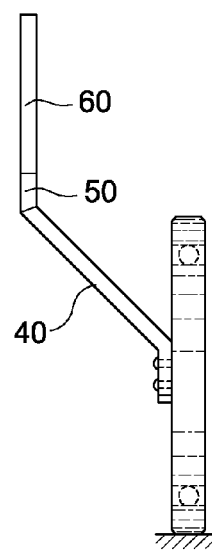
FIG. 7 is a schematic side view of FIG. 6.
Figure 8:
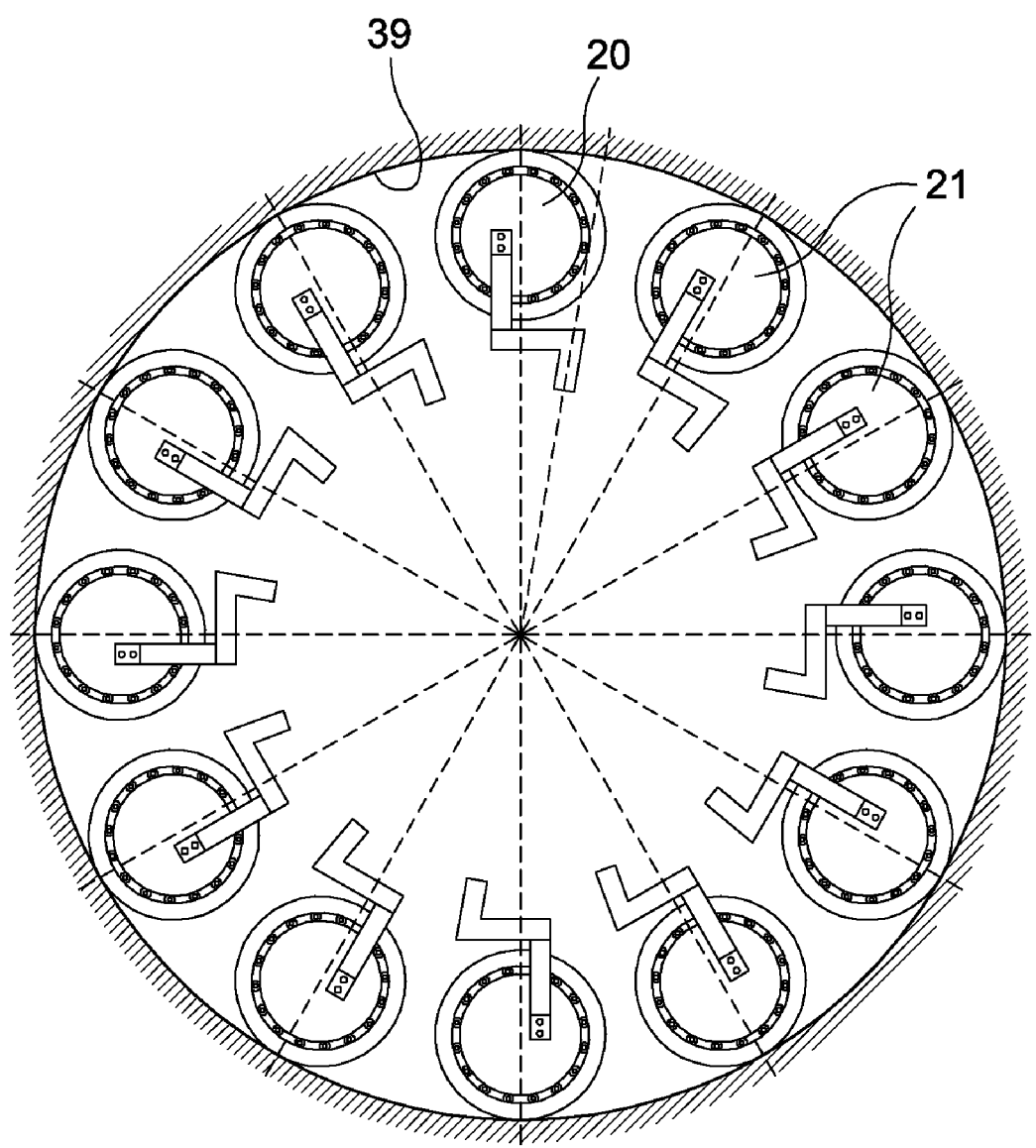
FIG. 8 is an exemplary view detailing a multiple application of FIG. 4.

As further shown in FIGS. 4 and 8, the target surface 39 may alternately be shaped outwardly circular relative the system 10. In this application, it is recommended that the first extension 50 be formed from the outer end 44 maintaining a right angle between the shaft 40 and the first extension 50, and the second extension 60 be aligned such that the second extension 60 be facing an imaginary center of the external circle defined by the circular target surface 39.

Figure 9:
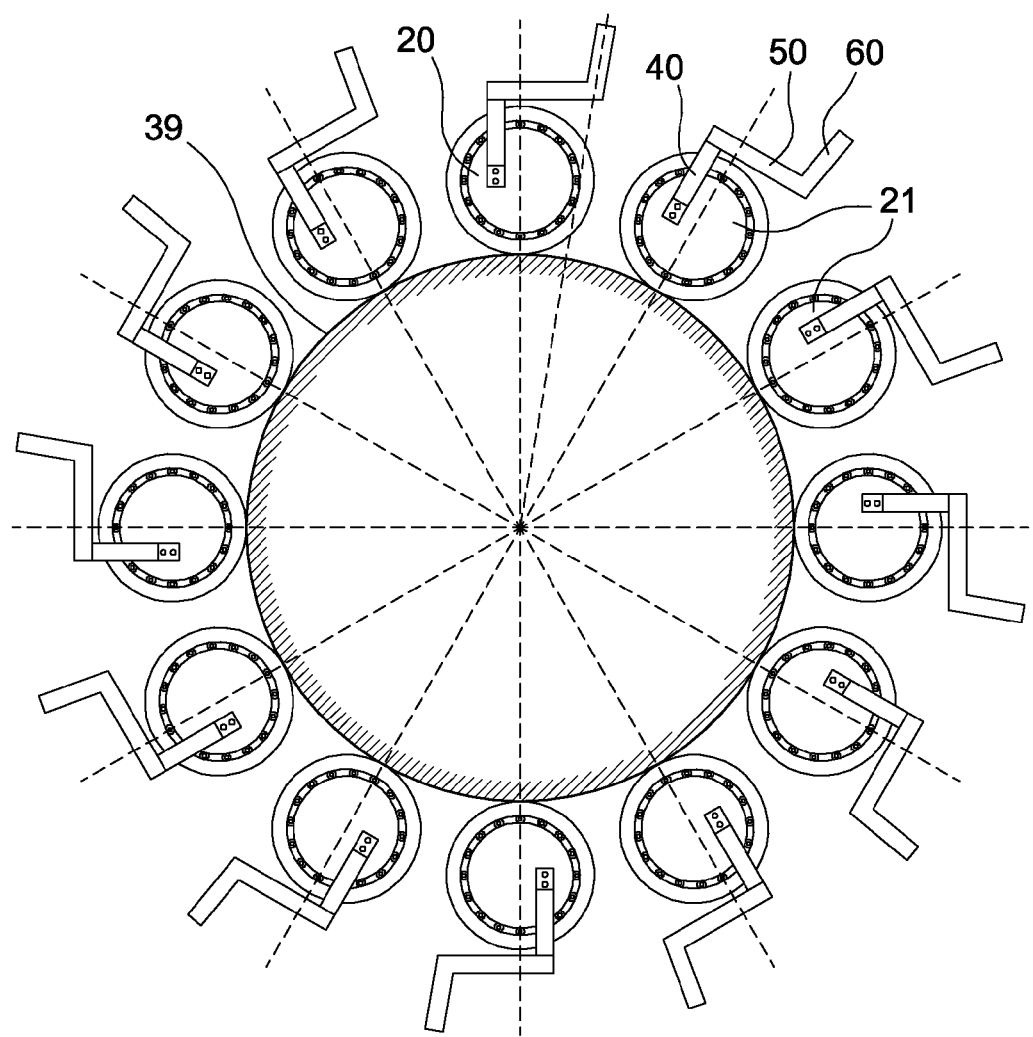
FIG. 9 is another exemplary view detailing a multiple application of FIG. 6.

Alternately, as further shown in FIGS. 5 and 9, the target surface 39 may be shaped inwardly circular relative the system 10 so that the second extension 60 be aligned with an imaginary center of a circle defined by the target surface 39.

In an embodiment, a plurality of second base disks 21 may be provided to become identically structured in conjunction with the first base disk 20, the ball bearing 30, and the shaft 40, so that each ring 34 rotates on and along the same target surface 39. In this construction, the target surface 39 may be substantially flat, inwardly circular or outwardly circular.

The extensions 50, 60 may be platform structured where the first platform 50 is attached to the second end 44 of the shaft 40, and the platform 50 is substantially parallel to the base disk 20, and the second platform 60 is outwardly extending in crank from the first platform 50. Preferably, the first platform 50 is angled with the shaft 40 by ninety (90) degrees and substantially oriented toward an opposite direction passing the disk central point 29 from the eccentric portion 28.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A rotation generating system, comprising:
   a base disk defined by a rim, top and bottom surfaces;
   a ball bearing engaged on and along the disk rim, said ball bearing comprising balls, a ring rotatably engaging the balls to the disk rim, and side supports propping the balls between the disk rim and the ring;
   a shaft having first and second ends, wherein the first end is fixed to an eccentric portion of the disk top surface, wherein the shaft is angled with the disk top surface by forty-five (45) degrees; and
   a first platform attached to the second end of the shaft, wherein the first platform is substantially parallel to the base disk, wherein the first platform is angled with the shaft by ninety (90) degrees and substantially oriented toward an opposite direction passing the disk central point from the eccentric portion.

2. The rotation generating system of claim 1, further comprising, a second platform outwardly extending from the first platform.

3. The rotation generating system of claim 1, wherein the eccentric portion is substantially centered between the disk rim and a central point of the base disk.

4. The rotation generating system of claim 1, wherein the ring is rotatably engaged to a target surface, wherein the target surface is substantially flat.

5. The rotation generating system of claim 1, wherein the ring is rotatably engaged to a target surface, wherein the target surface is shaped circular.

6. The rotation generating system of claim 1, wherein the ring is rotatably engaged to a target surface, wherein the target surface is shaped inwardly circular.

7. The rotation generating system of claim 1, further comprising a plurality of second base disks structured identically in conjunction with the first base disk, the ball bearing, and the shaft, wherein said each ring rotates on and along a target surface.

8. The rotation generating system of claim 7, wherein the ring is rotatably engaged to a target surface, wherein the target surface is substantially flat.

9. The rotation generating system of claim 7, wherein the ring is rotatably engaged to a target surface, wherein the target surface is shaped circular.

10. The rotation generating system of claim 7, wherein the ring is rotatably engaged to a target surface, wherein the target surface is shaped inwardly circular.

* * * * *